March 1, 1927.

V. W. SCHWARZ 1,619,490

MOLD PLATE FOR ROOFING TILE MACHINES

Original Filed Jan. 12, 1925   2 Sheets-Sheet 1

Inventor
Vincent W. Schwarz
By Wooster & Davis
Attorneys.

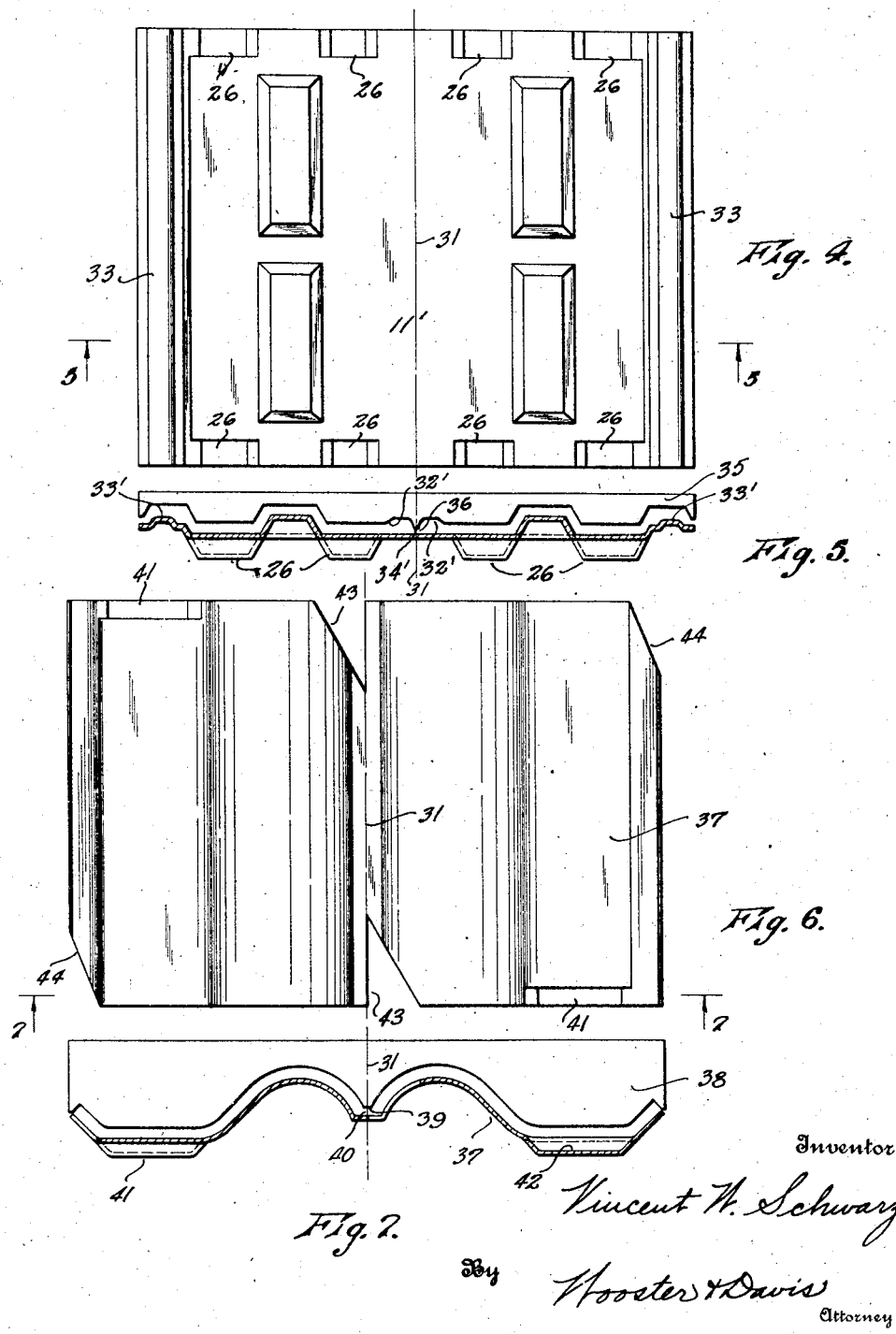

Patented Mar. 1, 1927.

1,619,490

UNITED STATES PATENT OFFICE.

VINCENT W. SCHWARZ, OF NORTH BERGEN, NEW JERSEY.

MOLD PLATE FOR ROOFING-TILE MACHINES.

Application filed January 12, 1925, Serial No. 1,776. Renewed January 22, 1927.

This invention relates to a machine for making tile, especially concrete roofing tile, and has for an object to provide a mold for this type of machine which will at least double the capacity of the machine without increasing the number of men required to operate the same, and without increasing the speed of operation of the machine.

With the foregoing and other objects in view I have devised the construction illustrated in the accompanying drawings forming a part of this specification, similar reference characters being employed throughout the various figures to indicate corresponding elements. In these drawings, Fig. 1 is a longitudinal vertical section through the front portion of a machine for making tile taken substantially on line 1—1 of Fig. 2.

Fig. 4 is a top plan view of a mold for making French tile but reversed from the showing in Fig. 3, Fig. 5 is a transverse section of the same substantially on line 5—5 of Fig. 4.

Fig. 6 is a top plan view of a mold for making Spanish tile, and

Fig. 7 is a transverse section of the same substantially on line 7—7 of Fig. 6.

Figure 1:
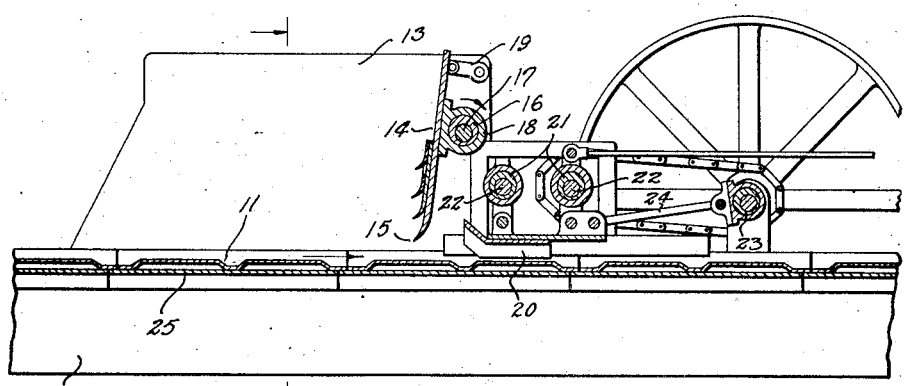

The tile machine, a portion of which is shown in Fig. 1, is of the same type as that disclosed in the joint application of John N. Schwarz and Vincent W. Schwarz, Serial No. 603,991, filed November 29, 1922, and I have, therefore, illustrated in the drawings only enough of the machine to clearly disclose my present invention.

The machine comprises a suitable frame 10 mounted on suitable supports, not shown, this frame carrying the mechanism for supporting the molds 11 on which the tiles are formed, and which are advanced at a continuous and uniform rate by means of endless chains 12. The lower or return run of these chains is not shown, the chains running at their opposite ends over suitable sprockets driven by any suitable power means, all of which is not shown as it is a common mechanical construction and forms no part of my present invention. At the forward part of the machine is a hopper 13 located above the molds and arranged to fill them with concrete as the molds are advanced under this hopper. At the rear end of this hopper is a gate 14 placed in an upright position and extending transversely over the top of the molds with its lower edge 15 of a shape corresponding to substantially the desired contour for the upper surface of the tile. This gate is mounted to have an up and down and longitudinal movement, the movement being imparted by an eccentric 16 mounted on a suitable power driven shaft 17 and running in a bearing 18 secured to the gate, the upper portion of the gate being held by suitable pivoted links 19. As the eccentric is rotated clockwise as viewed in the figure it will be apparent the lower edge of the gate is given an up and down and longitudinal movement, the movement, however, when in its lowest position being to the left as viewed in this figure or contrary to the direction of the movement of the molds 11, which move to the right in the direction of the arrow. Thus this gate regulates the amount of concrete which is carried forwardly out of the hopper by the molds. At the rear of the gate is a tamper 20 formed on its under side of a shape corresponding to the contour of the upper surface of the tile, this tamper having an up and down and longitudinal movement to tamp the concrete into the molds and also shape the upper surface of the tile. It is mounted on two eccentrics 21 carried by power driven shafts 22 which impart the up and down movement and the longitudinal movement is given by means of an eccentric 23 connected to the tamper by a rod 24.

The molds 11 are carried by suitable plates 25 which are secured to the chains 12, the lugs 26 formed on the bottoms of the molds seating in suitable recesses 27 in these plates so that there is a rigid driving connection between them, although the molds may be easily removed by merely lifting them upwardly from the plates. The plates run along the top of central longitudinal guide beams 28 and angle shaped shoes or guides 29 on the sides of the frame. These plates also have upwardly extending flanges 30 at their opposite side edges which form the outer edges of the tile as they are molded in the molds. As the molds are advanced under the hopper they are filled with concrete which is held to substantially the proper depth by the gate 14 and then this concrete is tamped to form by the tamper 20. Beyond or to the rear of the tamper are usually provided suitable finishing devices, such as trowels for smoothing the surface of the tile, or means for feeding coloring matter to this surface, but I have not shown these means in the drawing as they form no part of my present invention and may be of any suitable type desired, such as that shown in the application above mentioned.

Figure 2:
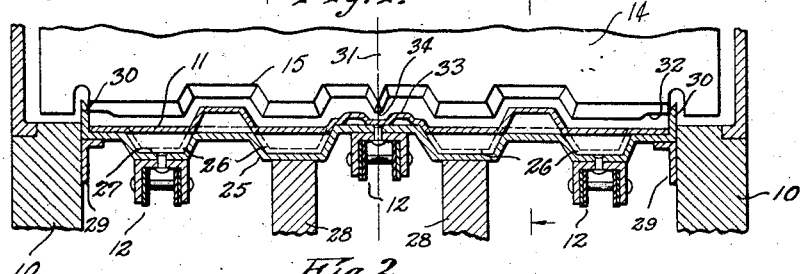
Fig. 2 is a transverse section thereof substantially on line 2—2 of Fig. 1.
Figure 3:
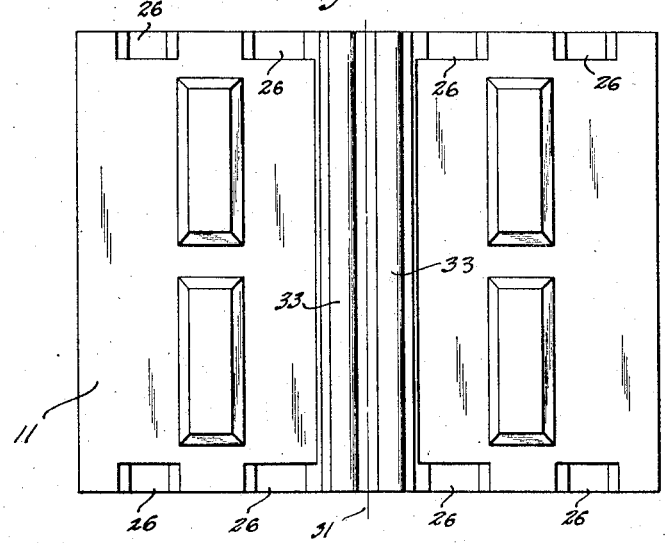
Fig. 3 is a top plan view of one of the molds for making French tile.

Heretofore it has been possible to form only one tile at a time, but I have devised a construction of mold whereby two tiles may be constructed at one time, thus doubling the capacity of the machine, and this may be done without increasing the number of men required in the operation of the machine as the molds are so constructed that two tiles are handled by the same man and in the same manner as would be a single tile in the old construction. Referring to Figs. 2 and 3 it will be seen that I have made each mold of a width to correspond with the width of two tiles, the junction between the two being indicated by the line 31. This type of tile is provided along one longitudinal edge with a rib which is formed by the groove 32 in the under side of the tamper and this rib interlocks with a similarly shaped groove provided adjacent the opposite edge and on the under side of an adjacent tile which is formed by the rib 33, this groove and rib acting to lock the overlapping edges of two adjacent tiles together when they are mounted on the roof. It will be apparent from Figs. 2 and 3 that I have so formed the mold 11 that the two tiles which are formed on this mold are reversed, so that the two ribs 33 are placed on opposite sides of the center or junction line 31, and the tamper 20 is provided with a downwardly extending rib 34 which extends within a short distance of the upper surface of the mold between the two ribs 33. This rib will form a groove in the top of the finished tiles and thus will leave a relatively thin longitudinal connection between the two tiles which may be easily cut or broken when the tiles are removed from the molds, so that although the two tiles are molded integral and at the same time they are easily separated by merely cutting or breaking them apart. The recesses in the molds to form the lugs 26 which also form locking lugs on the tile, are also reversed in the mold so that the two tiles after they have been cut or broken apart are exactly the same. It will thus be seen that with a single machine I may form two tiles at once with my construction, and that the two tiles and the molds for forming them may be handled in the same manner by a single operator where in the old construction one tile only was handled, and therefore, by this construction I have doubled the capacity of the machine without increasing the speed of operation.

In Figs. 4 and 5, I have shown how a mold may be constructed to form two tiles at one operation and together, but the relation of the two tiles in this form is reversed from that shown in Figs. 2 and 3, that is, the ribs 33' corresponding to ribs 33 in the first form are now arranged along the outside edges, while the grooves 32' corresponding to the grooves 32 in the first form are arranged adjacent the junction line 31. The tamper 35, however, is provided with a downwardly extending rib 34' on this junction line, corresponding to the rib 34 in the first form, to form a longitudinal groove at the junction between the two tiles to leave a relatively thin connection 36 which may be easily cut or broken to separate the tile as in the first form. The arrangement of the two tiles is also reversed, but the two tiles when separated are exactly alike.

In Figs. 6 and 7, I have shown how the same idea may be used for making Spanish tile. These tiles are comprised essentially of two substantially cylindrical ribs curved in opposite directions and I have provided a mold 37 which will form two of these tiles at once. The arrangement of the molds is such that the two tiles are formed in reverse relation the same as in making the French tile, the tamper being shown at 38. This tamper also has a downwardly extending rib 39 at the junction line between the two tiles which form a longitudinal groove between the two tiles, corresponding to the grooves formed by the ribs 34 and 34' in the first two forms, and leaves a relatively thin connection 40 between the two tiles which may be easily cut or broken to separate them. It will be noted that the tiles are reversed with the half convex at the top adjacent the center, and that the lug 41 which engages the plate on the chain and also provides a recess 42 which forms a lug on the bottom of the tile are reversed as shown in Fig. 6. In this form of mold they are cut away somewhat at their opposite ends as shown at 43 and also slabbed off at one corner as shown at 44 to fit certain projections on the plate. Aside from the peculiar shape of these tiles the method of handling the molds, molding the tile and separating them is the same as described in connection with the French tile.

It is to be noted that by reversing the two mold sections which are joined as one mold to form two tiles at once, the portions of the two tiles on opposite sides of the connecting or breaking line 31 and the ribs 34 and 34' are just the same. There will, therefore, be a uniform action and working of the concrete on opposite sides of these ribs giving a uniform product in both tiles. If they were not reversed the difference in the two opposite edges of the tiles would tend to force the concrete to one side or the other making one side denser than the other and giving a non-uniform product, and also making it difficult to finish them properly.

Having thus set forth the nature of my invention, what I claim is:

1. In a tile forming machine, a plurality of molds, means for advancing the molds, and means above the molds for shaping the top of the tile, said molds being of a width transverse the direction of movement to form two integral tiles, and said mold and forming means being arranged to form the two tiles in reverse relation.

2. In a tile forming machine, a plurality of molds, means for advancing the molds, and means above the molds for shaping the top of the tile, said molds being of a width transverse the direction of movement to form a plurality of tiles, said forming means being provided with a downwardly extending rib on the junction line between two adjacent tiles to form a longitudinal relatively thin connection between them which may be easily cut or broken.

3. In a tile forming machine, a plurality of molds, means for advancing the molds, and means above the molds for shaping the top of the tile, said molds being of a width transverse the direction of movement to form a plurality of tiles, said forming means being provided with means for forming a longitudinal groove on the junction line between two adjacent tiles to provide a relatively thin connection between them which may be easily cut or broken.

4. In a tile making machine, a plurality of molds placed end to end, means for advancing the molds, means above the molds for shaping the tops of the tiles, said molds being of a width to form a plurality of tiles, and means for forming a longitudinal groove at the junction between two adjacent tiles to form a relatively thin connection between them.

In testimony whereof I affix my signature.

VINCENT W. SCHWARZ.